United States Patent
Thoonsen

(10) Patent No.: US 10,286,965 B2
(45) Date of Patent: May 14, 2019

(54) BALLASTING DEVICE FOR A TRACTOR, ESPECIALLY A FARMING TRACTOR

(71) Applicant: ALTHIMASSE, Loudéac (FR)

(72) Inventor: Joseph Thoonsen, Loudéac (FR)

(73) Assignee: ALTHIMASSE (FR)

( * ) Notice: Subject to any disclaimer, the term of this patent is extended or adjusted under 35 U.S.C. 154(b) by 45 days.

(21) Appl. No.: 15/620,876

(22) Filed: Jun. 13, 2017

(65) Prior Publication Data

US 2017/0369110 A1 Dec. 28, 2017

(30) Foreign Application Priority Data

Jun. 22, 2016 (FR) ...................................... 16 55811

(51) Int. Cl.
 *B60R 9/06* (2006.01)
 *B62D 49/06* (2006.01)
 *B60R 11/06* (2006.01)
 *B62D 49/08* (2006.01)

(52) U.S. Cl.
 CPC ............ *B62D 49/0628* (2013.01); *B60R 9/06* (2013.01); *B60R 11/06* (2013.01); *B62D 49/085* (2013.01)

(58) Field of Classification Search
 CPC .... B62D 49/0628; B62D 49/08; B62D 49/06; B62D 49/085; B60R 9/06; B60R 9/065
 USPC .......................................................... 224/410
 See application file for complete search history.

(56) References Cited

U.S. PATENT DOCUMENTS

| | | | | |
|---|---|---|---|---|
| 2,701,728 A | * | 2/1955 | Miller | B62D 49/085 180/313 |
| 2,797,121 A | * | 6/1957 | Aud | B60R 19/48 293/121 |
| 3,032,352 A | * | 5/1962 | Barrett | B62D 49/085 180/900 |
| 3,490,787 A | * | 1/1970 | Lacey | B62D 49/0628 212/178 |

(Continued)

FOREIGN PATENT DOCUMENTS

| | | |
|---|---|---|
| DE | 20 2011 000 694 U1 | 7/2011 |
| EP | 2 275 324 A1 | 1/2011 |

(Continued)

OTHER PUBLICATIONS

French Search Report dated Mar. 14, 2017 in corresponding French Patent Application No. 1655811.

*Primary Examiner* — Brian D Nash
(74) *Attorney, Agent, or Firm* — Ostrolenk Faber LLP

(57) ABSTRACT

A main ballasting weight (10) straight from the foundry for a farming tractor, comprising upper faces and lower faces (11, 12), two faces (13, 14) oriented transversely to the direction of movement of the tractor, and two lateral faces (15, 16) parallel to the direction of movement of the tractor, said lower face comprising dovetail type means of connection (121, 122) to provide an anchoring with a secondary weight, said upper face forming an upper plate comprising a means of pre-positioning and centring (110) of a box (20) designed to be mounted on said main weight, said lateral faces (15, 16) being able to cooperate with lateral flanges (22, 23) of said box which are attached bearing against said lateral faces and having fixation orifices (150) able to receive fixation screws cooperating with said lateral flanges for the fixation of said box to said main weight.

13 Claims, 2 Drawing Sheets

(56) References Cited

U.S. PATENT DOCUMENTS

| | | | | |
|---|---|---|---|---|
| 3,517,941 A * | 6/1970 | Lazzeroni | B62D 49/085 | 280/759 |
| 3,614,135 A * | 10/1971 | Eid | B62D 49/08 | 220/3.94 |
| 3,758,132 A * | 9/1973 | Elfes | B62D 49/085 | 280/759 |
| 3,944,252 A * | 3/1976 | Barth | B62D 49/085 | 280/759 |
| 4,462,611 A * | 7/1984 | Sieren | B62D 49/085 | 280/759 |
| 4,580,811 A * | 4/1986 | Wykhuis | B62D 49/085 | 280/759 |
| 4,720,122 A * | 1/1988 | Brimeyer | B62D 49/085 | 280/759 |
| 4,969,533 A * | 11/1990 | Holm | B62D 21/186 | 180/273 |
| 4,971,356 A * | 11/1990 | Cook | B62D 37/04 | 280/759 |
| 5,462,309 A * | 10/1995 | Jeffers | E02F 9/18 | 187/222 |
| 6,283,527 B1 * | 9/2001 | Desmarais | B60P 1/00 | 280/759 |
| 6,471,245 B1 * | 10/2002 | Schott | B62D 49/085 | 280/759 |
| 6,595,397 B2 * | 7/2003 | Teich | B60R 9/06 | 224/410 |
| 7,147,250 B2 * | 12/2006 | Kubo | B62D 49/085 | 280/755 |
| 7,354,066 B2 * | 4/2008 | Yamamoto | B62D 49/085 | 280/759 |
| 7,618,062 B2 * | 11/2009 | Hamm | B62D 49/085 | 280/759 |
| 7,971,906 B2 * | 7/2011 | Defrancq | A01B 59/06 | 172/272 |
| 8,131,433 B2 * | 3/2012 | Bordini | B62D 49/085 | 280/755 |
| 8,430,427 B1 * | 4/2013 | Gaeddert | B62D 49/085 | 212/195 |
| 8,662,460 B2 * | 3/2014 | Heimbuch | B62D 49/085 | 212/178 |
| 9,139,059 B1 * | 9/2015 | Kringstad | B62D 49/085 | |
| 9,180,820 B2 * | 11/2015 | Klein | A01B 76/00 | |
| 9,545,956 B2 * | 1/2017 | Lu | B62D 25/2072 | |
| 2002/0014506 A1 * | 2/2002 | Teich | B60R 9/06 | 224/441 |
| 2010/0236955 A1 * | 9/2010 | Lase | B60R 9/065 | 206/373 |

FOREIGN PATENT DOCUMENTS

| | | |
|---|---|---|
| EP | 2 380 804 A1 | 10/2011 |
| EP | 2 842 808 A1 | 3/2015 |
| FR | 2 953 478 A1 | 6/2011 |

* cited by examiner

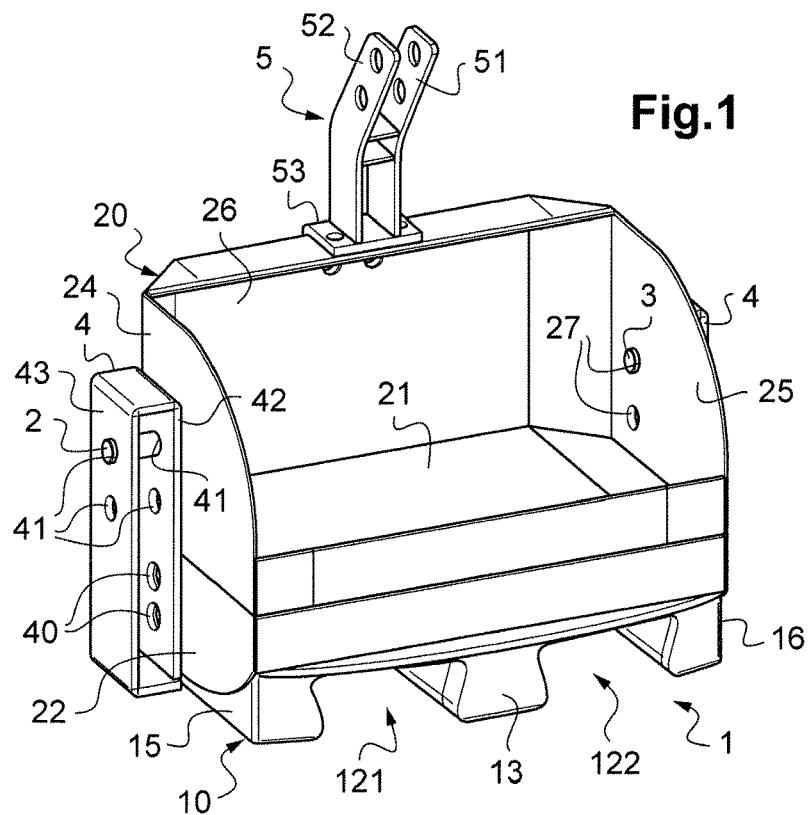
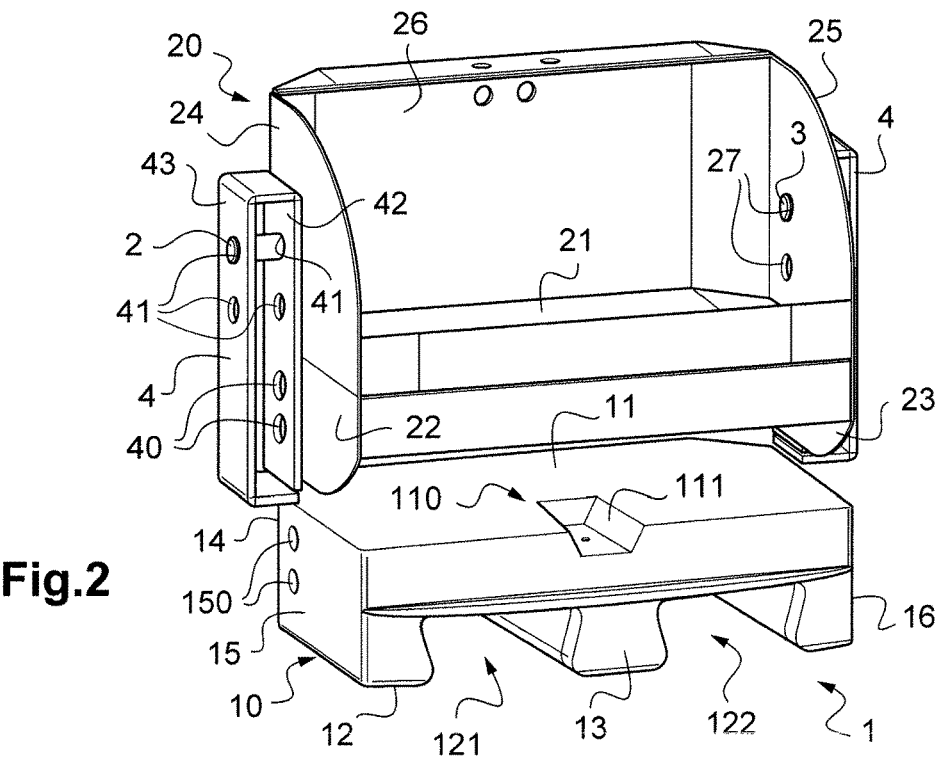

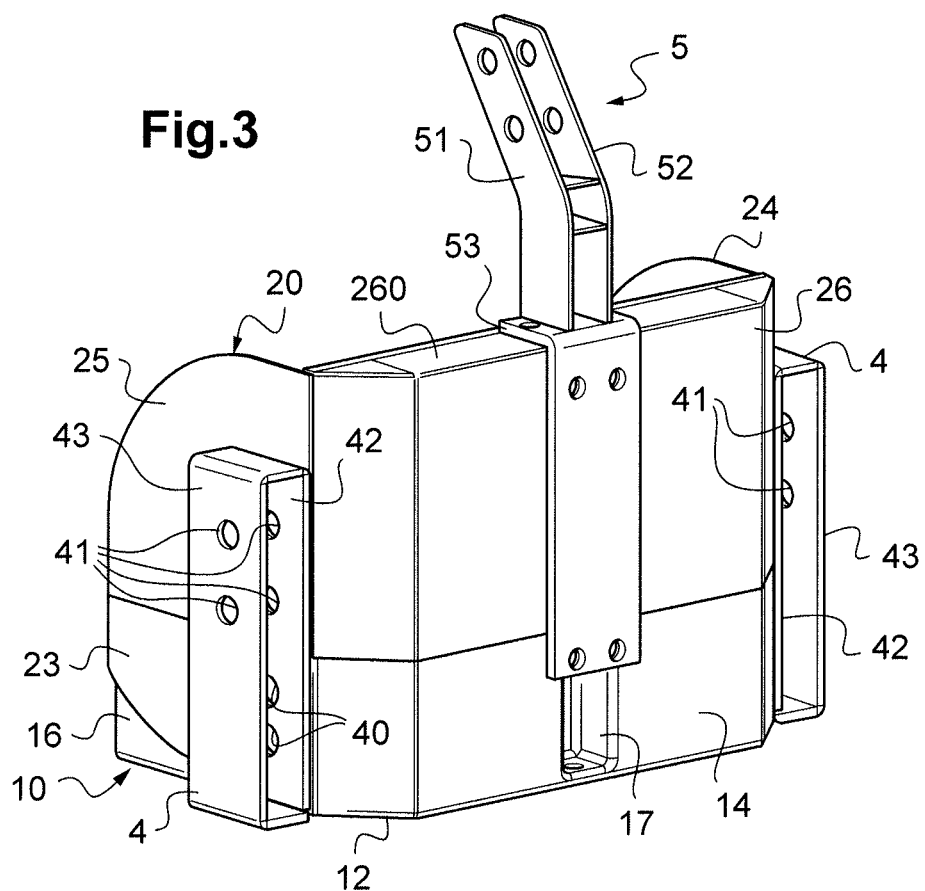

BALLASTING DEVICE FOR A TRACTOR, ESPECIALLY A FARMING TRACTOR

TECHNICAL FIELD

The invention concerns a ballasting device for a tractor, especially a farming tractor, comprising a monobloc weight designed to be hooked to a lifting device or to a weight carrier of the tractor, especially for increasing the weight of the tractor during operations requiring elevated traction forces.

BACKGROUND OF THE INVENTION

Conventionally, such a weight is designed to be carried by a lifting device in front of and/or behind the tractor, typically composed of two lifting arms on either side of the weight, provided at their end with a hook supporting the weight via transverse axes projecting from the weight on its lateral faces. Weights of this type are well known, especially by the example of the system marketed under the brand "Easymass®". This latter system is furthermore adaptable and allows a secondary weight to be added to the main weight hooked to the front of the tractor. The secondary weight can be added on as needed against the front face of the main weight and held against it by an anchoring device in order to make the assembly heavier. However, this system has the drawback of significantly increasing the cantilever in front of the tractor when the secondary weight is in place.

The applicant has also developed an easily modulable system of counterweights, allowing the loading of a regulable weight on the lifting device of the tractor in front of or behind the tractor, while reducing the front or rear cantilever, regardless of the weight being carried. This system, described in the patent document EP 2 275 324 in the name of the applicant, comprises a main monobloc ballasting weight designed to be hooked to a lifting device of a farming tractor, having in its lower part at least one seat to receive a secondary ballasting weight able to be disposed beneath the main weight, the receiving seat cooperating with a corresponding protuberance of the secondary weight, ensuring together with the latter an anchoring in the form of a dovetail joint whose longitudinal direction is substantially parallel to the direction of movement of the tractor.

Such an arrangement enables a vertical stacking of several blocks, including the main weight and one or more secondary weights located beneath the main weight, such that the cantilever is increased very little, if at all, as compared to a "main weight" configuration by itself. Moreover, this system contributes to a perfect integration of the weights among themselves, promoting the overall aesthetic appearance of the system.

Beyond the problems of ballasting and aesthetic dimension, user expectations are propelling the makers of ballasting systems to offer ever more functionalities so as to meet these expectations. In particular, one need of users involves the possibility of being able to mount various tools on the tractor. In this regard, one knows, from patent document FR2953478, a solution consisting in integrating a tool box in the cast block making up the ballasting weight. To accomplish this, the ballasting weight comprises a seat situated at the top profile of the weight, possibly covered by a lid. This seat also makes it possible to outfit the farming tractors with a supplemental storage space which can advantageously accommodate various tools needed for farming work, such as wrenches, towbars, etc. This supplemental storage space however has the drawback of only providing a relatively reduced storage volume. Moreover, the presence of the storage space implies making a cavity in the body of the ballasting weight, to the detriment of the overall weight of the latter, which is not desirable. The lost weight can be made up by increasing the size of the ballasting weight, but now to the detriment of its compact design.

There is also a need for an improved ballasting device, which on the one hand is easily modulable without risk of increasing the front or rear cantilever, regardless of the weight on board the tractor, and which on the other hand allows the integration of a storage space without the aforementioned drawbacks.

SUMMARY OF THE INVENTION

Toward this end, the invention concerns, according to a first one of its aspects, a main ballasting weight straight from the foundry, designed to be hooked to a lifting device or to a weight carrier of a tractor, especially a farming tractor, said main weight comprising an upper face, a lower face, two faces oriented substantially transversely to the direction of movement of the tractor, and two lateral faces substantially parallel to the direction of movement when it is secured to the tractor, said main weight having on its lower face at least one female dovetail seat able to cooperate with a corresponding male dovetail protuberance of a secondary ballasting weight for the mounting by fitting of said secondary ballasting weight in a fitting direction substantially parallel to the direction of movement of the tractor, said device being characterized in that said upper face forms an upper plate comprising a means of pre-positioning and centring of a box designed to be mounted on said main weight, and in that said lateral faces are able to cooperate with lateral flanges of said box which are attached bearing against said lateral faces and have fixation orifices able to receive fixation screws cooperating with said lateral flanges for the fixation of said box to said main weight.

According to one embodiment, said means of pre-positioning and centring comprises at least one groove made in the thickness of said upper plate, said groove being able to receive a pre-centring pin integrated with said box, said pin being inserted into said groove to allow the positioning of said box on said upper plate.

Advantageously, said groove extends in a direction substantially parallel to the direction of movement of the tractor and emerges in the area of the face oriented substantially transversely to the direction of movement of the tractor situated opposite the tractor as compared to said main weight when said main weight is mounted on the tractor.

Advantageously, said groove has at least one abutment making it possible to secure said box on said upper plate in a predetermined position when it is mounted on said main weight.

Preferably, each of said lateral faces comprises two fixation orifices aligned vertically for the fixation of said box.

According to one embodiment, said main weight is adapted to be secured to the tractor by means of two transverse axes respectively constituting an engagement means for a lifting device of the tractor, each of the transverse axes being mounted rigidly and perpendicularly through a mounting bracket able to be secured to said main weight through said fixation orifices provided on said lateral faces of said main weight.

Advantageously, said mounting bracket has at least two mounting positions for said transverse axes in the vertical direction making it possible to modify the ground clearance of said main weight when it is secured to the tractor.

Advantageously, said main weight may likewise comprise a fixation cavity disposed in said face oriented substantially transversely to the direction of movement of the tractor situated on the side of the tractor when said main weight is secured to the tractor, said fixation cavity being designed to cooperate with a weight carrier rigidly secured to the tractor for the fixation of said main weight.

Advantageously, said main weight may likewise comprise a handling means embedded in said main weight in the area of said face oriented substantially transversely to the direction of movement of the tractor situated opposite the tractor in relation to said main weight when said main weight is secured to the tractor.

The invention likewise concerns, according to another of its aspects, a box, particularly a tool box, characterized in that it is adapted to be mounted on a main ballasting weight as described above, said box comprising lateral flanges in a prolongation of lateral walls of said box, able to be attached bearing against said lateral faces of said main weight, and at least one pre-centring pin integrated with said box and able to cooperate with said pre-positioning and centring means integrated with said upper plate of said main weight.

Advantageously, the lateral walls of the box comprise at least one bore through which an end portion of the transverse axis passing through said mounting bracket is able to emerge into the interior of the box.

Advantageously, the box comprises a bracket arranged in the area of a rear wall of said box, designed to cooperate with a retaining arm integrated with the tractor, said bracket being formed by two vertical plates projecting upward from an upper edge of said rear box wall and between which a retaining axis can be mounted for connection to said retaining arm.

The invention likewise concerns, according to yet another of its aspects, a ballasting device for a tractor, especially a farming tractor, characterized in that it comprises a main ballasting weight as described above and a box as described above, mounted on said main weight.

BRIEF DESCRIPTION OF THE DRAWINGS

Other characteristics and advantages of the invention will emerge clearly from the following description of a particular embodiment of the invention presented as an illustration and in no way limiting, making reference to the following figures, among which:

FIG. 1 illustrates a schematic front view, in perspective, of the ballasting device according to the invention comprising a main ballasting weight according to the invention and a tool box according to the invention, mounted on the main weight;

FIG. 2 illustrates the device of FIG. 1 in exploded view;

FIG. 3 illustrates a schematic rear view of the device of FIG. 1.

DESCRIPTION OF PREFERRED EMBODIMENTS

The ballasting device 1 represented in the figures is designed to be mounted on a tractor, for example a farming tractor. It comprises a main weight 10 to which a box 20 can be attached, typically a tool box, and able to provide a sizeable storage space, in particular to accommodate various tools needed for farming work. The main weight 10 is a so-called monobloc weight, in a single piece, for example of cast iron, straight from the foundry. The main weight weighs, for example, 600 or 900 kg. The main weight is designed to be hooked to a front or rear lifting device of the tractor, classically composed of two lifting arms provided with a U-shaped hook at their free end, forming a bearing to receive transverse axes 2, 3, mounted rigidly and perpendicularly through mounting brackets 4, which are themselves designed to be secured to the sides of the main weight 10. The connection between the transverse axes 2, 3 and the arms is realized by ball joints and locking means adapted to hold the axes 2, 3 and their respective ball joint in the U. The transverse axes 2, 3 are designated such in relation to the direction of movement of the tractor.

The main weight 10, when it is secured to the tractor, has an upper face 11, a lower face 12, two faces 13, 14, respectively a front face and a rear face, oriented substantially transversely to the direction of movement of the tractor, and two lateral faces 15, 16 substantially parallel to the direction of movement of the tractor. The notions "front" and "rear" are used here in relation to an embodiment where the main weight 10 is situated in front of the tractor. One will understand that in the case of a weight situated behind the tractor, the notions "front" and "rear" are reversed in order to understand the actual orientation (the front becomes the rear and vice versa).

This weight 10 is known as the main weight inasmuch as it is possible to add to it, optionally, a secondary ballasting weight, of variable weight, according to the principles set forth in the patent document EP2275324. Also, as explained in this document, the main weight 10 is designed to accommodate, in a lower zone, a secondary monobloc weight (not shown) designed to further weigh down the ballasting device on board the tractor as need be. To accomplish this, the main weight 10 has two female dovetail seats 121, 122 on its lower face 12, extending in the direction of movement of the tractor, and designed to cooperate with two corresponding male dovetail protuberances provided in the upper portion of the secondary ballasting weight. The seats 121, 122 emerge on the front face 13 of the main weight 10 such that the protuberances are introduced into the seats 121, 122 by the front face 13 of the main weight 10, then the secondary weight is moved backward. In the rear, the seats 121, 122 may or may not be emergent. Thus, the seats 121, 122 of female dovetail shape allow the mounting by fitting of secondary ballasting weights in a fitting direction substantially parallel to the direction of movement of the tractor.

According to the invention, the upper face 11 of the main weight forms an upper plate on which rests the tool box 20 when it is mounted on the main weight 10. More precisely, the tool box 20, produced for example in a mechanical and welded manner, comprises a flat bottom 21, whose dimensions are substantially equal to those of the upper plate of the main weight 10 and able to bear against the latter, and lateral flanges 22, 23 extending downward from the lateral walls 24, 25 of the tool box 20 and designed to be attached by bearing against the lateral faces 15, 16 of the main weight 10. The tool box 20 also comprises a rear wall 26, extending transversely between the two lateral walls 24, 25. Thus, the lateral and rear walls, as well as the flat bottom, bound off the storage space of the tool box.

The upper face 11 forming the upper plate of the main weight 10 is devised so as to produce a means 110 of pre-positioning and centring of the tool box 20. This means 110 of pre-positioning and centring comprises, according to the exemplary embodiment, a cavity preferably in the form of a groove 111 having a rectangular or trapezoidal cross sectional profile devised in the thickness of the upper plate 11 of the main weight 10. The groove 111 preferably extends in a direction substantially parallel to the direction of movement of the tractor. The groove 111 is designed to receive a pre-centring pin (not shown) devised on a face of the flat bottom 21 of the box lying opposite the upper plate 11, so that the pin is inserted into the groove 111 to allow the positioning of the box on the upper plate of the main weight 10. In this position of insertion, the pin received in the groove 111 abuts against the latter, allowing the box 20 to be secured on the upper plate 11 in a predetermined position when it is mounted on the main weight. One will ensure that the groove 111 made in the upper plate of the main weight 10 emerges in the area of the front face 13 of the main weight 10 so as to facilitate the disengaging of the centring pin, integrated with the tool box, from the groove.

Furthermore, the lateral faces 15, 16 of the main weight 10, against which the lateral flanges 22, 23 of the box will bear when the box is mounted on the main weight 10, comprise fixation orifices 150 which are designed to receive fixation screws (not shown) cooperating with the lateral flanges 22, 23 for the fixation of the box 20 on the main weight 10. Preferably, two fixation orifices 150 are provided, aligned in the vertical direction on the respective lateral faces 15, 16 of the main weight 10. The lateral flanges 22, 23 of the box 20 also comprise corresponding orifices for the passage of the fixation screws designed to penetrate into the fixation orifices 150 provided on the respective lateral faces 15, 16 of the main weight 10. When the box 20 attached to the main weight 10 is positioned in the predetermined position via the means of pre-positioning and centring 110, the orifices devised on the lateral flanges 22, 23 of the box 20 are aligned with the fixation orifices 150 devised on the lateral faces 15, 16 of the main weight 10.

The main weight 10 thus has, on the one hand, means of fixation of a secondary ballasting weight, constituted by the female dovetail seats 121, 122 devised on the lower face 12 of the main weight, and, on the other hand, means of fixation of a tool box providing a storage space independent of the weight, constituted by the groove 111 and the fixation orifices 150 devised respectively on the upper face 11 and the lateral faces 15, 16 of the main weight 10.

As stated previously, each of the transverse axes 2, 3 is mounted through mounting brackets 4, preferably welded onto the lateral walls 24, 25 and the lateral flanges 24, 25 of the tool box 20, and furthermore likewise secured to the body of the main weight 10, in the area of its lateral faces 15, 16. Each mounting bracket 4 comprises two opposite walls 42, 43, substantially parallel to the direction of movement of the tractor when the bracket is secured to the body of the weight, respectively a first wall 42 designed to be situated on the side with the main weight, and a second wall 43, situated opposite the main weight in relation to the first wall. The mounting brackets 4 are preferably fixed to the main weight 10 through fixation orifices 150 provided on the lateral faces 15, 16 of the main weight 10 for the fixation of the tool box 20. The mounting brackets 4 then comprise orifices 40 devised on the first wall 42, designed to be aligned with the corresponding orifices provided on the lateral flanges 22, 23 of the tool box 20 and the fixation orifices 150 provided on the lateral faces 15, 16 of the main weight 10. The fixation screws received in the fixation orifices 150 of the lateral faces 15, 16 of the main weight are thus designed to join together the mounting to brackets 4, the tool box 20 and the body of the main weight 10. When the mounting brackets 4 are secured to the main weight 10, the transverse axes 2, 3 are in alignment with each other.

Moreover, each mounting bracket 4 preferably has two positions for mounting of the transverse axes 2, 3 in the vertical direction, making it possible to define two height positions for the weight with respect to the tractor: a high position and a low position. One may thus adjust the ground clearance of the main weight 10 when it is attached to the tractor via these transverse axes 2, 3. Each mounting position of a transverse axis on the mounting bracket 1 is defined by a pair of bores 41 situated opposite each other on opposite walls 42, 43 of the mounting bracket 4, between which is mounted the transverse axis, whose one end portion furthermore emerges into the interior of the box through a corresponding bore 27 devised on the lateral walls of the box mounted on the main weight and designed to be lined up with the pair of bores 41 of the mounting bracket 4. This emergent shaft end portion is locked, for example, by a pin and makes it possible to guarantee a firm attachment.

As appears in FIG. 3, the main weight 10 may likewise comprise a fixation cavity 17 devised in the rear face 14 of the main weight. This fixation cavity is designed to cooperate with a weight carrier secured rigidly to the tractor for the fixation of the main weight. Thus, the main weight 10 may likewise be mounted on a weight carrier, which constitutes an alternative to the previously mentioned lifting device, for tractors which are not equipped with such a device.

The main weight 10 may further comprise a handling means (not shown) arranged in the area of its front face 13, in particular in the area of the substantially central portion of the front face situated between the two seats 121, 122. This handling means may be in the form of two holding plates substantially parallel to the direction of movement of the tractor, embedded in the main weight 10 and projecting from the front face of the main weight 10. These two plates are designed to cooperate with an axis for connection to a winching system, for example.

The lifting device of the tractor, besides the two lifting arms designed to engage with the transverse axes 2, 3 situated on the sides of the ballasting device 1, may likewise comprise a retaining arm situated in high position and substantially in the middle of the lifting device. In this case, as illustrated in FIGS. 1 and 3, the ballasting device 1 has a supplemental hooking means 5, making it possible to connect it to the high retaining arm of the lifting device of the tractor. Such an attachment in particular makes it possible to prevent the swaying of the ballasting device about the transverse axes 2, 3. This supplemental hooking means 5 comprises a bracket fixed to the box 20 mounted on the main weight 10, designed to cooperate with the retaining arm of the lifting device. The bracket 5 is devised in the area of the rear wall 26 of the box 20, in substantially middle position, so as to project upward from an upper edge 260 of the rear wall 26 of the box. The bracket is formed by two vertical plates 51, 52, substantially parallel to the direction of movement of the tractor, integrated with a base 53 which is screwed onto the box 20. According to the exemplary embodiment, the base 53 is square-shaped and secured by two screws to the upper edge 260 and by four screws to the rear wall of the box. The retaining arm integrated with the tractor may then be connected and held between these plates 51, 52 via a system with retaining axis and locking pin (not shown).

The invention claimed is:

1. In combination, a main ballasting weight and a box configured for cooperating with the main ballasting weight to define the combination;

the main weight comprising an upper face and a lower face spaced from the lower face, the upper and lower faces being oriented substantially transversely to a direction of movement of the ballasting weight, and the main weight further comprising two lateral faces oriented substantially parallel to a direction of movement when the weight is moved in the direction of movement;

the main weight having at least one female dovetail seat on the lower face thereof, the dovetail seat being configured to cooperate and connect with a corresponding male dovetail protuberance for enabling mounting of the male protuberance in the at least one female dovetail in a fitting direction substantially parallel to the movement direction of the ballasting weight;

the upper face of the main weight forms an upper plate comprising means of prepositioning and centering the box to be mounted on the main weight;

the box having lateral flanges; the lateral faces of the main weight are configured to cooperate with the lateral flanges of the box, and the lateral flanges of the box are attached for bearing against the lateral faces of the main weight; and the lateral faces of the main weight have fixation orifices configured to receive fixation screws cooperating with the lateral flanges of the box for fixation of the box to the main weight.

2. The combination of the main weight and the box according to claim 1, wherein the means for prepositioning and centering comprising at least one groove defined in a thickness of the upper plate;

a pre-centering pin integrated with the box;

the groove in the thickness of the upper plate being configured to receive the pre-centering pin;

and the pre-centering pin being inserted into the groove for allowing the positioning of the box on the upper plate.

3. The combination of the main weight and the box according to claim 2, wherein the groove extends in a direction substantially parallel to the direction of movement of the weight, and the groove emerges in an area of the face oriented substantially transversely to the direction of movement of the main weight and situated opposite a device for moving the main weight when the main weight is secured to a device for moving the main weight.

4. The combination of the main weight and the box according to claim 2, wherein the groove has at least one abutment configured for enabling securing the box on the upper plate in a predetermined position when the box is mounted on the main weight.

5. The combination of the main weight and the box according to claim 1, wherein each of the lateral faces of the main weight comprises two fixation orifices vertically aligned for fixation of the box and the main weight.

6. The combination of the main weight and the box according to claim 1, wherein the main weight is configured to be secured to a movable vehicle by two transverse axes respectively comprising engagement means for an additional lifting device for lifting with respect to the main weight;

each of the transverse axes being mounted rigidly and perpendicularly through a mounting bracket, wherein the mounting bracket is configured to be secured to the main weight through the fixation orifices provided on the lateral faces of the main weight.

7. The combination of the main weight and the box according to claim 6, further comprising the mounting bracket having at least two mounting positions in a vertical direction for the transverse axes, the mounting bracket being configured for enabling modifying the ground clearance of the main weight when the main weight is mounted to an object.

8. The combination of the main weight and the box according to claim 1, wherein the main weight comprises a fixation cavity disposed in the face of the main weight wherein the face is oriented substantially transversely to the direction of movement and is situated on a side of a device for moving the main weight when the main weight is secured to a device for moving the main weight, the fixation cavity being configured to cooperate with a weight carrier secured to the device for moving the main weight.

9. The combination of the main weight and the box according to claim 1, wherein the main weight comprises a handling device embedded in the main weight in an area of the face of the main weight which is oriented substantially transversely to the direction of movement of the main weight and the handling device is situated opposite a device for moving the main weight when the main weight is secured to the device for moving the main weight.

10. The combination of the main weight and the box according to claim 1, wherein the box is configured to be mounted on the main weight;

the lateral flanges of the box defining a prolongation of the lateral walls of the box, wherein the lateral flanges are thereby configured to be attached to bear against the lateral faces of the main weight; and at least one pre-centering pin integrated with the box and configured to cooperate with the pre-positioning and centering means integrated with the upper plate of the main weight.

11. The combination of the main weight and the box according to claim 10, wherein the box is configured to be mounted on the main ballasting weight, and wherein the main weight is configured to be secured to a vehicle;

two transverse axes respectively constituting an engagement means for securing the box to a lifting device of the vehicle, each of the transverse axes being mounted rigidly and perpendicularly through a mounting bracket configured to be secured to the main weight through the fixation orifices provided on the lateral faces of the main weight; and the lateral walls comprise at least one bore through which an end portion of the transverse axis passing through the mounting bracket is able to emerge into an interior of the box.

12. The combination of the main weight and the box according to claim 10, further comprising a bracket arranged in an area of a rear wall of the box, the bracket cooperating with a retaining arm integrated with a vehicle, the bracket being comprised of two vertical plates projecting upward from an upper edge of the rear box wall; and a retaining axis configured to be mounted for connection to the retaining arm.

13. A ballasting device for a vehicle, comprising the combination of the main ballasting weight and the box according to claim 1, the box being configured to be mounted on the main ballasting weight;

the lateral flanges of the box comprising a prolongation of the lateral walls of the box, the lateral flanges being configured to be attached bearing against the lateral faces of the main weight; and at least one pre-centering pin integrated with the box and configured to cooperate with the pre-positioning and centering means integrated with the upper plate of the main weight, the device being mounted on said main weight.

* * * * *